(12) United States Patent
Zhang et al.

(10) Patent No.: US 10,761,642 B2
(45) Date of Patent: Sep. 1, 2020

(54) METHOD, MOBILE TERMINAL AND NON-TRANSITORY COMPUTER-READABLE STORAGE MEDIUM FOR ADJUSTING SCANNING FREQUENCY OF TOUCH SCREEN

(71) Applicant: GUANGDONG OPPO MOBILE TELECOMMUNICATIONS CORP., LTD., Dongguan, Guangdong (CN)

(72) Inventors: Qiang Zhang, Guangdong (CN); Mingqiang Guo, Guangdong (CN); Tong Han, Guangdong (CN); Rendong Shi, Guangdong (CN); Hao Wang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 38 days.

(21) Appl. No.: 16/042,126

(22) Filed: Jul. 23, 2018

(65) Prior Publication Data

US 2019/0034022 A1   Jan. 31, 2019

(30) Foreign Application Priority Data

Jul. 28, 2017   (CN) .......................... 2017 1 0631908

(51) Int. Cl.
*G06F 3/041* (2006.01)
*H04W 52/02* (2009.01)
(Continued)

(52) U.S. Cl.
CPC .......... *G06F 3/0416* (2013.01); *G06F 1/3206* (2013.01); *G06F 1/3262* (2013.01);
(Continued)

(58) Field of Classification Search
CPC ................. G06F 3/0412; G06F 3/0416; G06F 3/04166–041662; G06F 3/0418–04186;
(Continued)

(56) References Cited

U.S. PATENT DOCUMENTS

2006/0170658 A1\* 8/2006 Nakamura ............ G06F 3/0412
345/173
2008/0165115 A1   7/2008 Herz
(Continued)

FOREIGN PATENT DOCUMENTS

CN   103389790 A   11/2013
CN   104730919 A   6/2015
(Continued)

OTHER PUBLICATIONS

CN204578874 U _ English Abstract.
(Continued)

*Primary Examiner* — David Tung
(74) *Attorney, Agent, or Firm* — Ladas & Parry LLP

(57) ABSTRACT

A method for adjusting a scanning frequency of a touch screen is disclosed. An ambient brightness is acquired when receiving an instruction to light up the touch screen. Whether the ambient brightness is beyond a predefined ambient brightness range is determined. The scanning frequency of the touch screen is reduced, when the ambient brightness is beyond the predefined ambient brightness range. A mobile terminal and a non-transitory computer-readable storage medium are also disclosed.

17 Claims, 3 Drawing Sheets

(51) Int. Cl.
  *G06F 1/3206* (2019.01)
  *G06F 3/044* (2006.01)
  *G06F 1/3234* (2019.01)
  *G09G 3/20* (2006.01)
  *H04M 1/725* (2006.01)

(52) U.S. Cl.
  CPC ........ *G06F 3/044* (2013.01); *H04W 52/0254* (2013.01); *G06F 3/0412* (2013.01); *G09G 2360/144* (2013.01); *Y02D 70/00* (2018.01)

(58) Field of Classification Search
  CPC ...... G06F 3/044; G06F 1/3206; G06F 1/3262; Y02D 70/00; G09G 3/20; G09G 2320/0626; H04W 52/0254; H04W 52/029; H04W 52/027; H04M 1/72569
  See application file for complete search history.

(56) References Cited

U.S. PATENT DOCUMENTS

| | | | |
|---|---|---|---|
| 2008/0165116 A1* | 7/2008 | Herz | G09G 3/3406 345/102 |
| 2009/0207154 A1* | 8/2009 | Chino | G06F 3/0416 345/175 |
| 2012/0001960 A1 | 1/2012 | Herz | |
| 2012/0169236 A1* | 7/2012 | Kim | H05B 33/0872 315/127 |
| 2014/0125619 A1* | 5/2014 | Panther | G06F 3/04883 345/173 |
| 2014/0160085 A1 | 6/2014 | Rabii et al. | |
| 2015/0193070 A1 | 7/2015 | Tilak et al. | |

FOREIGN PATENT DOCUMENTS

| | | |
|---|---|---|
| CN | 204578874 U | 8/2015 |
| CN | 105162928 A | 12/2015 |
| CN | 106060285 A | 10/2016 |
| CN | 106559576 A | 4/2017 |
| CN | 106790974 A | 5/2017 |
| CN | 107484231 A | 12/2017 |
| WO | 2014036854 A1 | 3/2014 |

OTHER PUBLICATIONS

International Search Report in international application No. PCT/CN2018/094639, dated Aug. 24, 2018.
English Translation of the Written Opinion of the International Search Authority in international application No. PCT/CN2018/094639, dated Aug. 24, 2018.
Supplementary European Search Report in the European application No. 18185676.6, dated Mar. 29, 2019.
Partial European Search Report in European application No. 18185676.6, dated Dec. 3, 2018.

* cited by examiner

METHOD, MOBILE TERMINAL AND NON-TRANSITORY COMPUTER-READABLE STORAGE MEDIUM FOR ADJUSTING SCANNING FREQUENCY OF TOUCH SCREEN

CROSS REFERENCE TO RELATED APPLICATIONS

This application claims priority to Chinese patent application No. 201710631908.6 titled "METHOD, DEVICE, TERMINAL, AND COMPUTER READABLE STORAGE MEDIUM FOR ADJUSTING SCREEN PARAMETER", and filed on Jul. 28, 2017, the disclosure for which is hereby incorporated herein in its entirety by reference.

TECHNICAL FIELD

The present disclosure relates generally to touch screen technologies, and more particularly, to a method, a mobile terminal, and a non-transitory computer-readable storage medium for adjusting a scanning frequency of a touch screen.

BACKGROUND

With the development of smart terminals, mobile terminals, such as smart phones and tablet computers, are widespread. Users can use mobile terminals both indoors and outdoors. A terminal may adjust the brightness of its screen according to light intensity, to facilitate the users to see content displayed on the screen more clearly, for example, by increasing the brightness of the touch screen outdoors during daytime or reducing the brightness of the touch screen outdoors during nighttime. However, as the area of a touch screen is gradually increased, the power consumption of the touch screen is also gradually increased. How to reduce the power consumption of the touch screen is a problem to be solved at present.

SUMMARY

The present disclosure provides a method, a mobile terminal, and a non-transitory computer-readable storage medium for adjusting a scanning frequency of a touch screen, which may reduce power consumption of the touch screen.

According to one aspect of the present disclosure, a method for adjusting a scanning frequency of a touch screen is provided, including: acquiring an ambient brightness when receiving an instruction to light up the screen; determining whether the ambient brightness is beyond a predefined ambient brightness range; and reducing the scanning frequency of the touch screen, when the ambient brightness is beyond the predefined ambient brightness range.

According to an additional aspect of the disclosure, a mobile terminal for adjusting a scanning frequency of a touch screen is provided, including: a processor; a touch screen; and a memory including instructions operable to be executed by the processor to cause the processor to: acquire an ambient brightness when receiving an instruction to light up the screen; determine whether the ambient brightness is beyond a predefined ambient brightness range; and reduce the scanning frequency of the touch screen, when the ambient brightness is beyond the predefined ambient brightness range.

According to a further aspect of the disclosure, a non-transitory computer-readable storage medium for storing computer executable instructions is provided, the computer executable instructions being used to control a processor to execute a method for adjusting a method for adjusting a scanning frequency of a touch screen, the method comprising: acquiring an ambient brightness when receiving an instruction to light up the screen, determining whether the ambient brightness is beyond a predefined ambient brightness range; and reducing the scanning frequency of the touch screen, when the ambient brightness is beyond the predefined ambient brightness range.

DETAILED DESCRIPTION OF THE DISCLOSURE

Figure 1:
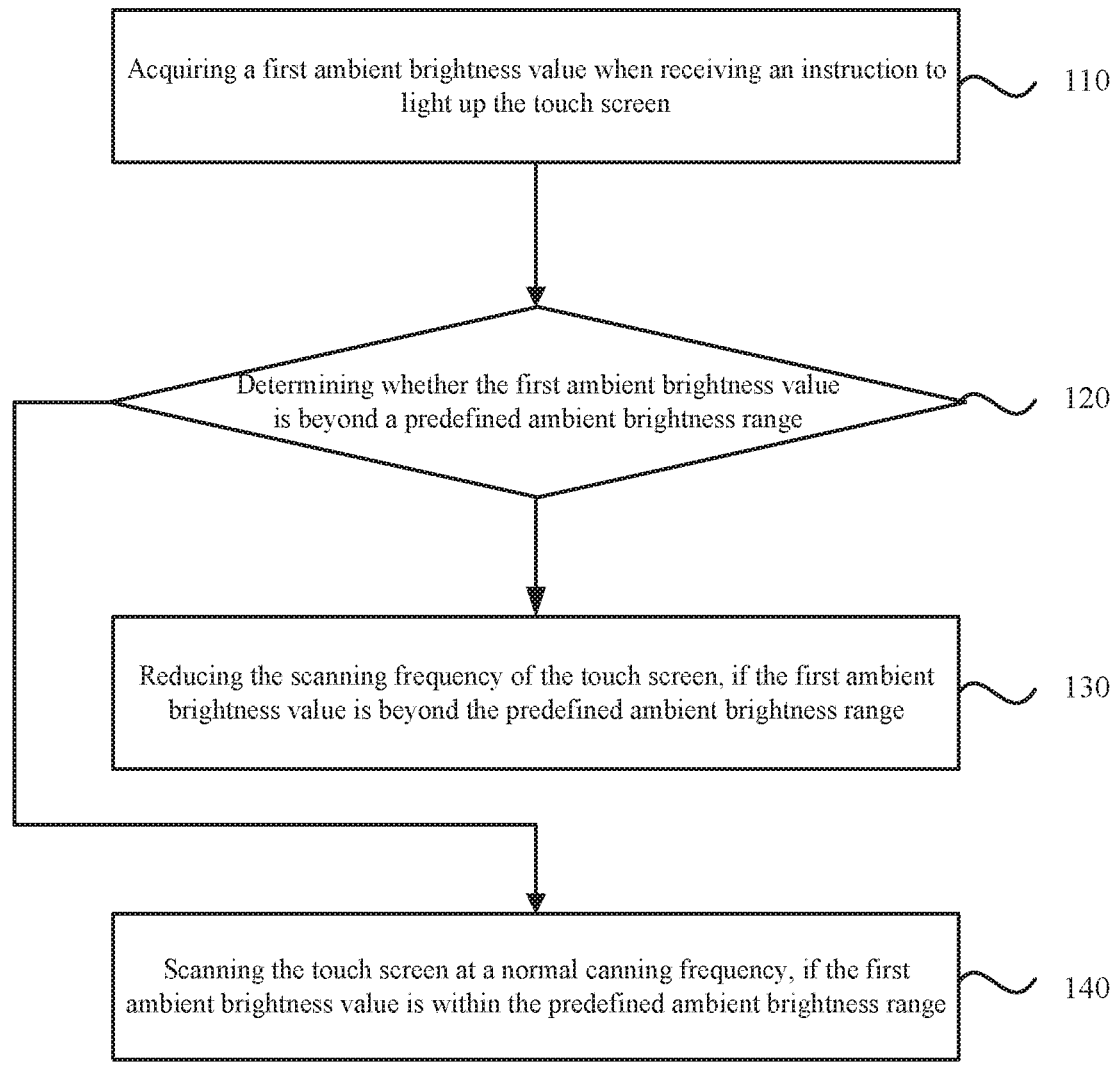
FIG. 1 is a flow diagram illustrating a method for adjusting a scanning frequency of a touch screen according to an embodiment of the present disclosure.

The present disclosure will be herein further described in detail in conjunction with accompanying drawings and the embodiments. It is understood that the embodiments described herein are intended to illustrate the present disclosure, but not to limit the present disclosure. Furthermore, it should be noted that, to facilitate the illustration, merely relevant parts and not all parts of the present disclosure are shown in the accompanying drawings.

Terminology used herein is for the purpose of describing particular embodiments only and is not intended to be limiting of the disclosure. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/". Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

The device described herein may include a mobile device or mobile terminal, such as smart phone (for example, Android mobile phone, iOS mobile phone, Windows mobile phone), tablet computer, personal digital assistant (PDA), laptop, mobile Internet device (MID) or wearable device. The above devices are provided for exemplary purposes and should not be interpreted to limit the scope of the device described herein.

Taking a mobile terminal as an example, implementations of the present disclosure will be described in detail. The mobile terminal may include a processor, for example, a central processing unit (CPU), and a touch screen. The processor is configured to control a scanning frequency of the touch screen.

For a traditional mobile terminal, the brightness of the touch screen may be adjusted by the processor based on an ambient brightness acquired by a brightness sensor arranged on the mobile terminal. However, the scanning frequency of the touch screen may remain very high. Thus, the touch screen still has high power consumption, regardless of its brightness. For example, it is difficult to read the touch screen of the mobile terminal in strong daylight, so the user operation on the touch screen will be reduced. For another example, the mobile terminal is generally used for lighting in dim lighting conditions, so the user operation on the touch screen will also be reduced. In these cases, if the touch screen is scanned at a normal scanning frequency, it is a waste of power. In view of the above, the present disclosure provides a method to avoid unnecessary power waste. With this method, the usage requirement of the user can be predicted based on the brightness of the ambient light outside the mobile terminal, and the scanning frequency of the touch screen can be reduced when there is no or low usage requirement, in addition to decrease the brightness of the touch screen.

FIG. 1 is a flow diagram illustrating a method for adjusting a scanning frequency of a touch screen according to an embodiment of the present disclosure. The method is appropriate to a mobile terminal with a touch screen, such as smart phone, tablet computer and the like. This method is suitable to be used in a process of lighting-up the touch screen of the mobile terminal, that is, a process of enabling the display of the touch screen.

As illustrated in FIG. 1, the method for adjusting a scanning frequency of a touch screen can begin at block 110.

At block 110, an ambient brightness may be acquired when receiving an instruction to light up the touch screen. The instruction to light up the touch screen may be triggered for example, when a user presses a virtual button or a physical button to enable the display of the touch screen. The instruction to light up the touch screen may also be triggered when a push message is received in the background of the mobile terminal through network.

The ambient brightness may be acquired at the last time when the touch screen disenable the display and stored on a memory of the mobile terminal. When receiving the instruction to light up the touch screen, the pre-stored ambient brightness will be read. Alternatively, the ambient brightness may be acquired by a brightness sensor. When receiving the instruction to light up the touch screen, the brightness sensor may be activated to acquire the ambient brightness. Specifically, the ambient brightness may be acquired by a brightness sensor arranged on a screen side of the mobile terminal, that is, a side of the mobile terminal where the touch screen is arranged. Such screen side of the mobile terminal is generally called as a front side of the mobile terminal.

In one embodiment, the mobile terminal may also be provided with two brightness sensors, including a first brightness sensor arranged on the front side of the terminal and a second brightness sensor arranged on the rear side of the terminal. In this case, two brightness sensors may acquire two brightness values respectively, and the ambient brightness is determined based on the acquired two brightness values. The first brightness sensor may be located near a front camera of the mobile terminal, while the second brightness sensor may be located near a rear camera of the mobile terminal. The brightness of the ambient light around the mobile terminal may be acquired more comprehensively with two brightness sensors, avoiding the problem that the value acquired by one single brightness sensor is biased, to improve the accuracy of the acquired ambient brightness. In other embodiments, the mobile terminal may also be provided with more than two brightness sensors.

When the mobile terminal is provided with at least two brightness sensors, the ambient brightness may be determined based on at least two brightness values acquired by the at least two brightness sensors respectively. In one embodiment, an average value of the at least two brightness values may be calculated as the ambient brightness. In another embodiment, the at least two brightness values may be weighted, and a sum of the weighted at least two brightness values may be calculated as the ambient brightness. The brightness sensor arranged on the front side of the mobile terminal may have a weight larger than that of a brightness sensor on other locations of the mobile terminal, for example, on the rear side of the mobile terminal.

In one embodiment, after acquiring a plurality of brightness values, it is determined whether the difference between any two of the brightness values is greater than a predefined difference. For example, when the mobile terminal is provided with a first brightness sensor arranged on the front side of the terminal and a second brightness sensor arranged on the rear side of the terminal, the first brightness sensor may acquire a first brightness value, and the second brightness sensor may acquire a second brightness value. When the difference between the first brightness value and the second brightness value is less than the predefined difference, it indicates that the ambient brightness of the ambient light around the mobile terminal can be represented by any one of the two brightness values. In this case, any one of the two brightness values may be selected as the ambient brightness. Alternatively, the average value of the brightness values may be calculated as the ambient brightness.

When the difference between the first brightness value and the second brightness value is greater than or equal to the predefined difference, it indicates that the first brightness value acquired by the first brightness sensor is quite different from the brightness value acquired by the second brightness sensor. For example, the mobile terminal may be used in a bright environment where the user holds the mobile terminal with his/her hand, so the first brightness value acquired on the front side of the mobile terminal is significant higher than the second brightness value acquired on the rear side of the terminal since the rear side of the terminal is shaded by the hand of the user. For another example, the mobile terminal may be used in dark space such as in a quilt and close to the user. The first brightness sensor may acquire a high brightness value due to the reflection of the light emitted by the touch screen from the face of the user, while the second brightness sensor may acquire a low brightness value since the rear side of the terminal is shaded by the hand of the user. In these cases, the ambient brightness may be distorted, if it is calculated on the average value of the first and second brightness values. Therefore, the brightness values may be weighted before summing, and the weight corresponding to the first brightness sensor may be greater than the weight corresponding to the second brightness sensor.

At block 120, whether the ambient brightness is beyond a predefined ambient brightness range may be determined. The predefined ambient brightness range may be set by a programmer or user. Alternatively, an appropriate range suitable for the user may be obtained through a plurality of experiments, and the appropriate range may be set as the predefined ambient brightness range.

In one embodiment, a glare threshold may be set as a upper limit value of the predefined ambient brightness range. When the first brightness value acquired by the first brightness sensor is greater than the upper limit value of the predefined ambient brightness range, that is, the glare threshold, the scanning frequency of the touch screen may be reduced. When the upper limit value of the predefined ambient brightness range is set to the glare threshold, if the first ambient brightness is greater than the glare threshold, it is determined that glare occurs. For example, when the user walks outdoors at noon and it is sunny, although the touch screen brightness has been adjusted to the highest level, the user may be still unable to read the content displayed on the touch screen clearly. Reducing the scanning frequency of the touch screen in this case can save the power consumption of the mobile terminal without affecting the operation of the user.

At block 130, the scanning frequency of the touch screen may be reduced, when the ambient brightness is beyond the predefined ambient brightness range.

In one embodiment, an identifying frequency and/or a reporting frequency of the touch screen may be reduced in addition to the scanning frequency of the touch screen.

The processes during which the mobile terminal acquires data through the touch screen include scanning the touch screen, identifying the scanned data and reporting the identified data. Reducing the frequency of any one or more of the above processes can reduce the power consumption of the terminal.

In the above embodiment, the scanning frequency of the touch screen may be reduced when glare occurs. As the area of the touch screen of the mobile terminal increases, each pixel of the touch screen is required to be scanned for each time of screen scanning, such that reducing the scanning frequency of the touch screen has a better effect on reducing the power consumption of a mobile terminal with a large touch screen.

Further, it is found that a user generally has a force of habit to use a mobile terminal, which may be reflected in that the user uses the mobile terminal at some common positions more frequently than other positions. In one embodiment, current position information of the mobile terminal may be determined, and the scanning frequency of the touch screen may be reduced, based on the current position information. For example, whether current position information is user common position information may be determined, and the scanning frequency of the touch screen may be reduced, when the current position information is not the user common position information.

During the initialization phase, the user may set the common position information, such as city and district. With the continuing usage of the user, the user common position information can be determined according to the coordinate information of the mobile terminal. The current position of the mobile terminal may be acquired through a GPS system. When the current position is located within a coordinate range corresponding to the common position information, it is determined the current position information is the user common position information.

The way to reduce the scanning frequency of the touch screen may be not limited. The target scanning frequency of the touch screen may be set to a predefined proportion of the normal scanning frequency of the touch screen. For example, the predefined proportion may be set to be larger than 0 and less than 1, preferably, to be 0.5.

At block 140, the touch screen may be scanned at a normal scanning frequency, when the ambient brightness is within the predefined ambient brightness range.

In this embodiment, the ambient brightness may be acquired when receiving an instruction to light up a screen, whether the ambient brightness is beyond a predefined ambient brightness range can be determined, and the scanning frequency of the touch screen can be reduced when the ambient brightness is beyond the predefined ambient brightness range. In comparison with scanning the touch screen at a constant frequency in the related art, the scanning frequency of the touch screen can be adjusted based on one or more ambient brightnesses in the above embodiments, so as to reduce the power consumption of the touch screen.

Figure 2:
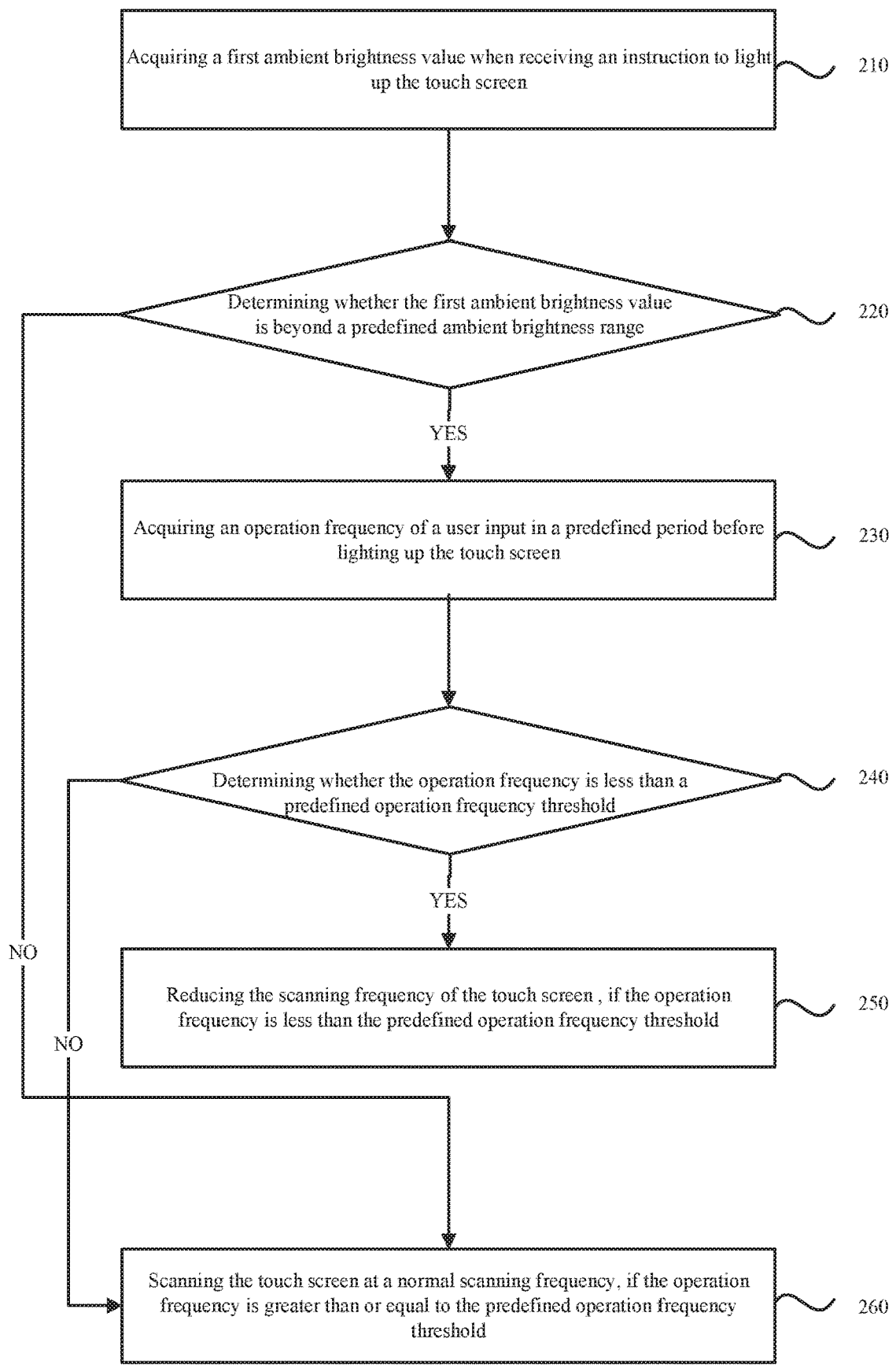
FIG. 2 is a flow diagram illustrating a method for adjusting a scanning frequency of a touch screen according to another embodiment of the present disclosure.

In another embodiment, as shown in FIG. 2, another method for adjusting a scanning frequency of a touch screen is provided. At block 210, an ambient brightness may be acquired when receiving an instruction to light up a screen. At block 220, whether the ambient brightness is beyond a predefined ambient brightness range may be determined. At block 230, an operation frequency of a user input in a predefined period may be acquired before lighting up the touch screen, when the ambient brightness is beyond the predefined ambient brightness range. The predefined period may include a time point when the instruction to light up the touch screen is received.

In one embodiment, the predefined period may include 10 or 30 minutes before the current time point when the instruction to light up the touch screen is received. The operation frequency may be a number of operations inputted by the user on the touch screen per minute.

At block 240, whether the operation frequency is less than a predefined operation frequency threshold may be determined. The predefined operation threshold is an average input frequency of using the terminal as normal by the user. Alternatively, the predefined operation frequency threshold is 3 times/minute. At block 250, the scanning frequency of the touch screen may be reduced, when the operation frequency is less than the predefined operation frequency threshold. At 260, the touch screen may be scanned at a normal scanning frequency, when the operation frequency is greater than or equal to the predefined operation frequency threshold.

According to the method for adjusting the touch screen parameter provided in this embodiment, the reliability of reducing the scanning frequency of the touch screen can be improved by determining whether to reduce the scanning frequency of the touch screen based on the latest operation frequency of the user when it is determined that the ambient brightness is beyond the predefined ambient brightness range.

Figure 3:
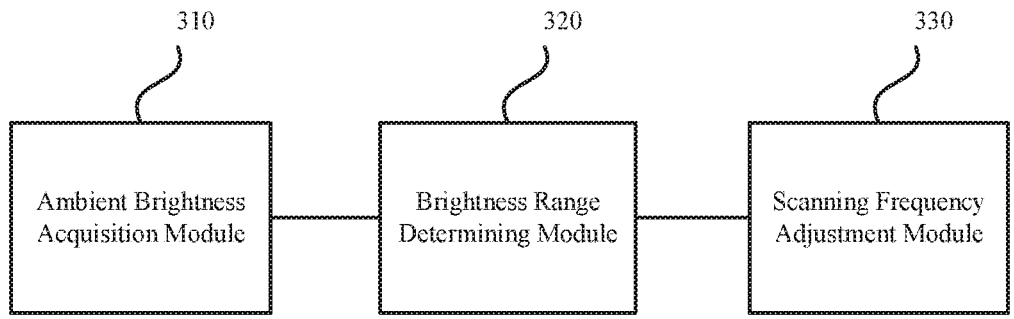
FIG. 3 is a structural schematic diagram illustrating function modules for adjusting a scanning frequency of a touch screen according to an embodiment of the present disclosure.

FIG. 3 is a structural schematic diagram illustrating function modules for adjusting a scanning frequency of a touch screen according to an embodiment of the present disclosure. These function modules can be implemented by software and/or hardware which may be integrated into a device. As illustrated in FIG. 3, these function modules include an ambient brightness acquisition module 310, a brightness range determining module 320 and a scanning frequency adjustment module 330.

The ambient brightness acquisition module 310 may be configured to acquire an ambient brightness when receiving an instruction to light up a screen. The brightness range determining module 320 may be configured to determine whether the ambient brightness acquired by the ambient brightness acquisition module 310 is beyond a predefined ambient brightness range. The scanning frequency adjustment module 330 may be configured to reduce the scanning frequency of the touch screen when the brightness range determining module 320 determines that the ambient brightness is beyond the predefined ambient brightness range.

In one embodiment, the scanning frequency adjustment module 330 may be further configured to: acquire an operation frequency of a user input in a predefined period before lighting up the touch screen, the predefined period comprising a time point when the instruction to light up the touch screen is received; determine whether the operation frequency is less than a predefined operation frequency threshold; and reduce the scanning frequency of the touch screen, when the operation frequency is less than the predefined operation frequency threshold.

In one embodiment, the ambient brightness acquisition module 310 may be further configured to: acquire, by the at least two brightness sensors, at least two brightness values respectively; and determine the ambient brightness based on the acquired at least two brightness values.

In one embodiment, the ambient brightness acquisition module 310 may be further configured to: obtain an average value of the at least two brightness values; and determine the ambient brightness as the average value.

In one embodiment, the ambient brightness acquisition module 310 may be further configured to: weight the at least two brightness values; obtain a sum of the weighted at least two brightness values; and determine the ambient brightness as the weighted sum of the at least two brightness values.

In one embodiment, the brightness range determining module 320 may be further configured to: determine whether a brightness value acquired by the brightness sensor on the front side of the touch screen is above an upper limit value of the predefined ambient brightness range. And the scanning frequency adjustment module 300 may be further configured to: reduce the scanning frequency of the touch screen when the brightness value acquired by the brightness sensor on the front side of the touch screen is above the upper limit value of the predefined ambient brightness range.

In one embodiment, the scanning frequency adjustment module 300 is configured to: reduce the scanning frequency of the touch screen, based on current position information of the touch screen.

In view of the above, the ambient brightness acquisition module 310 can acquire the ambient brightness when receiving the instruction to light up the touch screen, the brightness range determining module 320 can determine whether the ambient brightness is beyond the predefined ambient brightness range, and the scanning frequency adjustment module 330 can reduce the scanning frequency of the touch screen when the ambient brightness is beyond the predefined ambient brightness range. In comparison with scanning the touch screen at a constant frequency in the related art, the scanning frequency of the touch screen can be adjusted based on one or more ambient brightnesses in the above embodiments, so as to reduce the power consumption of the touch screen.

Figure 4:
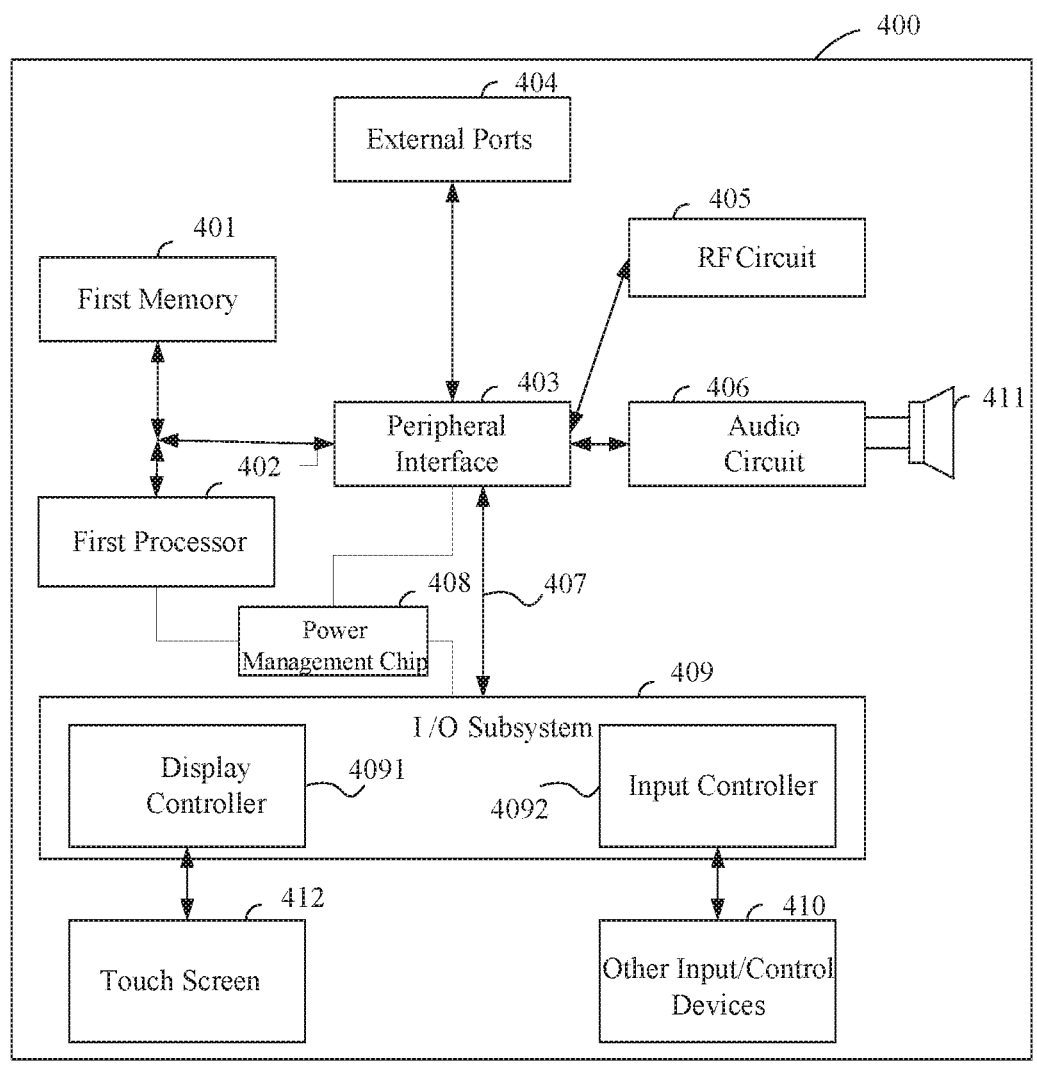
FIG. 4 is a structural schematic diagram illustrating a mobile terminal according to an embodiment of the present disclosure.

FIG. 4 is a structural schematic diagram illustrating a mobile terminal according to an embodiment of the present disclosure. As shown in FIG. 4, this mobile terminal may includes: an enclosure (not shown), a first memory 401, a first central processing unit (CPU) 402 (also referred to as "first processor", hereinafter briefly referred to as "CPU"), a computer program stored in the first memory 401 and executable in the first processor 402, a circuit board (not shown) and a power supply circuit (not shown). The circuit board is arranged inside a space enclosed by the enclosure. The CPU 402 and the first memory 401 are arranged on the circuit board. The power supply circuit is configured to supply power to each circuit or component of the terminal. The first memory 401 is configured to store executable program code. The CPU 402 may read the executable program code stored in the first memory 401 and execute the program corresponding to the executable program code, so that the CPU 402 is caused to: acquire an ambient brightness when receiving an instruction to light up a touch screen; determine whether the ambient brightness is beyond a predefined ambient brightness range; and reduce a scanning frequency of the touch screen, when the ambient brightness is beyond the predefined ambient brightness range.

The terminal may further include: a peripheral interface 403, a RF (Radio Frequency) circuit 405, an audio circuit 406, a loudspeaker 411, a power management chip 408, an input/output (I/O) subsystem 409, a touch screen 412, other input/control devices 410 and external ports 404. These components are communicated via one or more communication buses or signal lines 407.

Furthermore, the terminal may further include a camera and a RGB light sensor. The RGB light sensor may be located proximately to the camera, or may be arranged adjacently to the camera. The camera may be a front camera or a rear camera. The RGB light sensor may further be separately from the camera, for example be arranged on a narrow side of the terminal.

It should be understood that the illustrated terminal 400 is only an example of the terminal, and the terminal 400 may include more or less components than those illustrated in the drawing. It is possible to combine two or more components or have a different arrangement of the components. The various components illustrated in the drawings may be implemented by hardware including one or more signal processing and/or application specific integrated circuits, software or the combination of the hardware and software.

The terminal, taking a smart phone as an example of the same, provided in this embodiment and configured to implement the control of a doorbell will be herein described in detail.

The first memory 401 may be accessed by the CPU 402 and the peripheral interface 403. The first memory 401 may include a first high-speed random access memory, and may also include a first non-volatile memory, for example, at least one magnetic disk memory, flash memory or any other transitory solid-state memory.

The peripheral interface 403 may be configured to couple an input and output peripherals of the device to the CPU 402 and the first memory 401.

The I/O subsystem 409 may be configured to couple an input and output peripheral on the device, such as the touch screen 412 and the other input/control devices 410 to the peripheral interface 403. The I/O subsystem 409 may include a display controller 4091, and one or more input controllers 4092 configured to control the other input/control devices 410. The one or more inputting controllers 4092 may receive electrical signals from the other input/control devices 410, or transmit electrical signals to the other input/control devices 410. The other input/control devices 410 may include a physical button (such as press button, and rocker button), a dial, a sliding switch, a joystick and a scroll wheel. It should be noted that the input controller 4092 may be coupled to any one of a keyboard, an infrared port, a USB port and an indicating device such like a mouse. Furthermore, the other input/control devices 410 may further include a camera, a fingerprint sensor and a gyroscope.

According to operating principles and mediums transmitting information of the touch screen, the touch screen 412 may be classified as a resistive type touch screen, a capacitive inductive type touch screen, an infrared type touch screen or a surface acoustic wave type touch screen. According to assembling types, the touch screen 412 may be classified as an add-on type touch screen, an embedded type touch screen or an integral type touch screen. According to technical principles, the touch screen 412 may be classified as a touch screen with the vector pressure sensing technology, a touch screen with the resistive technology, a touch screen with the conductive technology, a touch screen with the infrared technology or a touch screen with the surface acoustic wave technology.

The touch screen 412 may be an input and output interfaces between the user terminal and the user and display visual output to the user. The visual output may include a graphic, a text, an icon, a video and the like. Alternatively, the touch screen 412 may transmit an electrical signal (such as an electrical signal of a contacting surface) on the touch screen triggered by the user to the first processor 402.

The display controller 4091 in the I/O subsystem receives an electrical signal from the touch screen 412 or transmits an electrical signal to the touch screen 412. The touch screen 412 detects a touch on the touch screen. The display controller 4091 converts the detected touch into an interaction with the user interface object displayed on the touch screen 412, i.e. realizing the human-computer interaction. The user interface object displayed on the touch screen 412 may be an icon for launching a game or an icon for connecting to a corresponding network. It should be noted that the device may further include an optical mouse, which is a touch sensitive surface that does not display visual output or is an extension of the touch sensitive surface formed by the touch screen.

The RF circuit 405, which is mainly configured to establish the communication between a smart speaker and a wireless network (i.e. a network side), so as to implement the data receiving and transmitting between the smart speaker and the wireless network, such as receiving and transmitting a message, an email or the like.

The audio circuit 406 is mainly configured to receive the audio data from the peripheral interface 403, convert this audio data into an electrical signal, and transmit the electrical signal to the loudspeaker 411.

The loudspeaker 411 is configured to restore an audio signal received from the wireless network by the smart speaker through the RF circuit 405 into a sound and play the sound to the user.

The power management chip 408 is configured to supply power to the CPU 402, the I/O subsystem and the hardware connected to the peripheral interface, and performs power management.

A non-transitory computer-readable storage medium for storing computer executable instructions is also provided. The computer executable instructions may be used to control a processor to execute a method for adjusting a method for adjusting a scanning frequency of a touch screen, the method comprising: acquiring an ambient brightness when receiving an instruction to light up the screen; determining whether the ambient brightness is beyond a predefined ambient brightness range; and reducing the scanning frequency of the touch screen, when the ambient brightness is beyond the predefined ambient brightness range.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, as part of a carrier wave, an electrical connection having one or more wires, an optical fiber, etc. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, electric wire, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a, wide area network (WAN), or the connection may be made to an external computer (for example, through the Internet using an Internet Service Provider).

It should be noted that, the above descriptions are merely the preferred embodiments and applied technical principles of the present disclosure. A person skilled in the art should understand that the present disclosure is not limited to the specific embodiments herein, and for a person skilled in the art, various obvious variations, readjustments and replacements may be made without departing from the protection scope of the present disclosure. Therefore, although the present disclosure is described in detail through the above embodiments, the present disclosure is not merely limited to the above embodiments. More other equivalent embodiments may further be included without departing from the conception of the present disclosure. The scope of the present disclosure is defined by the appended claims.

What is claimed is:

1. A method for adjusting a scanning frequency of a touch screen, comprising:
acquiring an ambient brightness when receiving an instruction to light up the touch screen;
determining whether the ambient brightness is beyond a predefined ambient brightness range; and
reducing the scanning frequency of the touch screen, when the ambient brightness is beyond the predefined ambient brightness range,
wherein acquiring the ambient brightness comprises:
acquiring a first brightness value by a first brightness sensor arranged on a first side of a mobile terminal where the touch screen is arranged;
acquiring a second brightness value by a second brightness sensor arranged on a second side of the mobile terminal different from the first side; and
determining the ambient brightness based on the acquired first and second brightness values,
wherein the method further comprises:
determining whether a glare occurs based on a brightness value acquired by the first brightness sensor, and reducing the scanning frequency of the touch screen when the glare occurs.

2. The method of claim 1, wherein reducing the scanning frequency of the touch screen comprises:
acquiring an operation frequency of a user input in a predefined period before lighting up the touch screen, the predefined period comprising a time point when the instruction to light up the touch screen is received;
determining whether the operation frequency is less than a predefined operation frequency threshold; and
reducing the scanning frequency of the touch screen, when the operation frequency is less than the predefined operation frequency threshold.

3. The method of claim 2, further comprising:
scanning the touch screen at a normal scanning frequency, when the operation frequency is greater than or equal to the predefined operation frequency threshold.

4. The method of claim 1, wherein determining the ambient brightness based on the acquired first and second brightness values comprises:
obtaining an average value of the first and second brightness values; and
determining the ambient brightness as the average value.

5. The method of claim 1, wherein determining the ambient brightness based on the acquired first and second brightness values comprises:
weighting the first and second brightness values;
obtaining a sum of the weighted first and second brightness values; and
determining the ambient brightness as the weighted sum of the first and second brightness values.

6. The method of claim 1, wherein reducing the scanning frequency of the touch screen comprises:
determining current position information of the touch screen; and
reducing the scanning frequency of the touch screen, based on the current position information.

7. The method of claim 1, wherein reducing the scanning frequency of the touch screen comprises:
reducing an identifying frequency of the touch screen when the scanning frequency of the touch screen is reduced.

8. The method of claim 1, wherein reducing the scanning frequency of the touch screen comprises:
reducing a reporting frequency of the touch screen when the scanning frequency of the touch screen is reduced.

9. The method of claim 1, wherein determining whether the glare occurs based on the brightness value acquired by the first brightness sensor comprises:
when the brightness value acquired by the first brightness sensor is above an upper limit value of the predefined ambient brightness range, it is determined that the glare occurs, wherein,
the predefined ambient brightness range is an appropriate range that is suitable for use.

10. A mobile terminal for adjusting a scanning frequency of a touch screen, comprising:
a processor;
a touch screen;
at least two brightness sensors, including a first brightness sensor located on a first side of the mobile terminal where the touch screen is arranged, and a second brightness sensor located on a second side of the mobile terminal; and
a memory including instructions operable to be executed by the processor to cause the processor to:
acquire an ambient brightness when receiving an instruction to light up the touch screen;
determine whether the ambient brightness is beyond a predefined ambient brightness range; and
reduce the scanning frequency of the touch screen, when the ambient brightness is beyond the predefined ambient brightness range,
wherein
the first brightness sensor is configured to acquire a first brightness value;
the second brightness sensor is configured to acquire a second brightness value; and
wherein the instructions when executed further cause the processor to:
determine the ambient brightness based on the acquired first and second brightness values, and
determine whether a glare occurs based on a brightness value acquired by the first brightness sensor, and reduce the scanning frequency of the touch screen when the glare occurs.

11. The mobile terminal of 10, wherein the instructions when executed further cause the processor to:
acquire an operation frequency of a user input in a predefined period before lighting up the touch screen, the predefined period comprising a time point when the instruction to light up the touch screen is received;
determine whether the operation frequency is less than a predefined operation frequency threshold; and
reduce the scanning frequency of the touch screen, when the operation frequency is less than the predefined operation frequency threshold.

12. The mobile terminal of claim 11, wherein the instructions when executed further cause the processor to:
scan the touch screen at a normal scanning frequency, when the operation frequency is greater than or equal to the predefined operation frequency threshold.

13. The mobile terminal of claim 10, wherein the instructions when executed further cause the processor to:
obtain an average value of the first and second brightness values; and
determine the ambient brightness as the average value.

14. The mobile terminal of claim 10, wherein the instructions when executed further cause the processor to:
  weight the first and second brightness values;
  obtain a sum of the weighted first and second brightness values; and
  determine the ambient brightness as the weighted sum of the first and second brightness values.

15. The mobile terminal of claim 10, wherein the instructions when executed further cause the processor to:
  determine current position information of the mobile terminal; and
  reduce the scanning frequency of the touch screen, based on the current position information.

16. The mobile terminal of claim 10, wherein the instructions when executed further cause the processor to:
  when the brightness value acquired by the first brightness sensor is above an upper limit value of the predefined ambient brightness range, determine that the glare occurs, wherein,
  the predefined ambient brightness range is an appropriate range that is suitable for use.

17. A non-transitory computer-readable storage medium for storing computer executable instructions, the computer executable instructions being used to control a processor to execute a method for adjusting a scanning frequency of a touch screen, the method comprising:
  acquiring an ambient brightness when receiving an instruction to light up the touch screen;
  determining whether the ambient brightness is beyond a predefined ambient brightness range; and
  reducing the scanning frequency of the touch screen, when the ambient brightness is beyond the predefined ambient brightness range,
  wherein acquiring the ambient brightness comprises:
  acquiring a first brightness value by a first brightness sensor arranged on a first side of a mobile terminal where the touch screen is arranged;
  acquiring a second brightness value by a second brightness sensor arranged on a second side of the mobile terminal different from the first side; and
  determining the ambient brightness based on the acquired first and second brightness values,
  wherein the method further comprises:
  determining whether a glare occurs based on a brightness value acquired by the first brightness sensor, and reducing the scanning frequency of the touch screen when the glare occurs.

\* \* \* \* \*